UNITED STATES PATENT OFFICE.

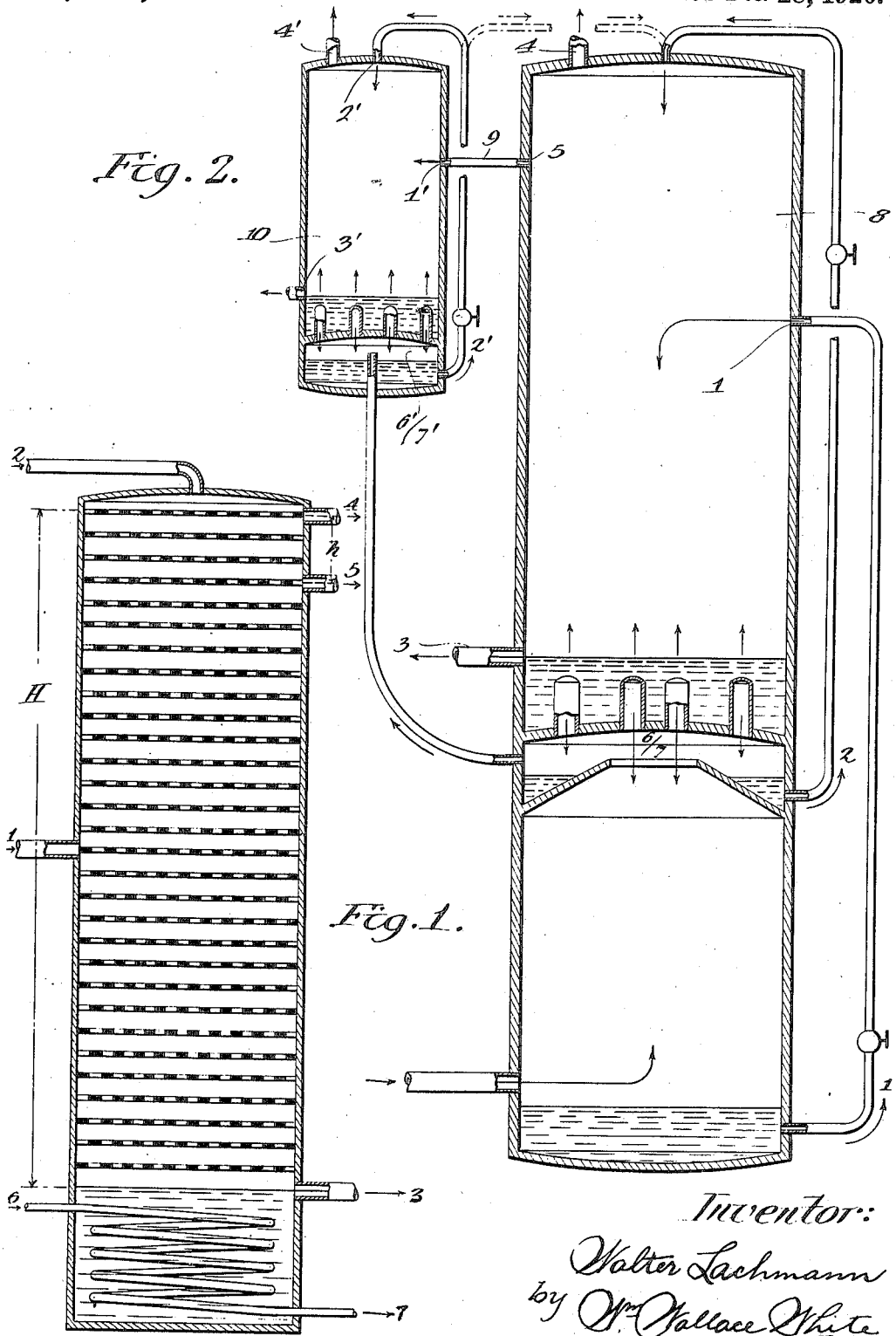

WALTER LACHMANN, OF DRESDEN, GERMANY.

CONTINUAL PROCESS OF FRACTIONALLY DISTILLING GASEOUS MIXTURES.

1,363,659. Specification of Letters Patent. Patented Dec. 28, 1920.

Application filed March 3, 1916, Serial No. 82,013. Renewed October 1, 1920. Serial No. 414,130.

*To all whom it may concern:*

Be it known that I, WALTER LACHMANN, scientific engineer, subject of Germany, residing at Dresden, in the German Empire, have invented new and useful Improvements in Continual Processes of Fractionally Distilling Gaseous Mixtures, of which the following is a specification.

The present invention relates to a process and an apparatus for the decomposition of air, or other mixtures of gases having different temperatures of condensation by continuous rectification.

According to the processes heretofore employed for this purpose, the air to be decomposed is introduced centrally into a rectifying column and caused to come into contact with liquid nitrogen descending from the top of the column. The air, a liquid nitrogen-oxygen mixture, sinks to the bottom of the column, but is heated at this point so as to become vaporized. The nitrogen constituent, being more volatile, passes off first and ascends to the top of the column, followed by the oxygen constituent. In the top of the column, the rising vapor is dephlegmated through refrigeration caused by the incoming liquid nitrogen and, as a result, pure gaseous nitrogen isues through a top outlet and impure oxygen in a liquid state passes out at a bottom outlet. By careful regulation of the apparatus used, either product may be obtained in a pure condition, but not both.

It is my object therefore to provide an improved process which will produce nearly all of the useful oxygen, in the case of air, and the largest part of nitrogen, or more volatile constituent, in the purest state, worthy of compression, and to provide an apparatus including a rectifying column capable of producing this result.

The feature which characterizes the new process is the continuous passage upward through the uppermost part of the rectification column of less vapor per unit volume of the down-flowing refrigerating liquid than that which passes through the part of the column situated lower down, this increasing of the value of the ratio of the down-flowing refrigerating liquid and the quantity of gas rising to the top of the column is effected by either diverting from the top of the column a certain quantity of gas consisting of a mixture of oxygen and nitrogen rising through the column or by diverting a regulatable part of the refrigerating liquid introduced into the column at the top thereof.

To these ends the invention consists in the operations and in the construction, arrangement and combination of parts described fully hereinafter and illustrated in the accompanying drawings, in which:—

Figure 1 is a diagrammatic view of a simple rectifying column constructed in accordance with the invention; and Fig. 2 is a similar view of a modified form of apparatus including a main column and a supplementary column, both being constructed in general like a well-known type of rectifying apparatus, but embodying also the improvement which constitutes the present invention.

In the drawing, referring particularly to Fig. 1, the numeral 1 designates the inlet for supplying the gaseous or liquid mixture of nitrogen and oxygen (atmospheric air) which is to be decomposed, to the column. This column is provided, by way of example, with perforated plates, and the inlet just described communicates medially therewith. An inlet 2 for supplying liquid nitrogen, or a liquid rich in nitrogen, to the column is connected with the top of the same. Near the bottom of the column an outlet 3 is provided for drawing off in a gaseous or liquid state the more readily condensable product of decomposition, which, in the case of air, is oxygen. Adjacent to the top of the column an outlet 4 is provided for drawing off in a gaseous state the more volatile product of decomposition, nitrogen. At the bottom of the column a heating device 6, 7, is located, and is operated by compressed gas. While this heating device is illustrated as being limited to the lowest part of the column, it is to be understood that it may be distributed over a more or less larger part of the column, and, if necessary, throughout its entire height.

Thus far, the rectifying column is substantially identical in construction with those ordinarily employed. In accordance with the known processes, a predetermined constant quantity of gaseous or liquid atmospheric air is supplied to the middle of the column through the inlet 1, and very pure liquid nitrogen is supplied through the inlet 2 at the top of the column. As the liquid nitrogen trickles down through the perforated plates of the column, the atmospheric air is decomposed and the constituent oxygen, in a liquid state, settles to the bottom, whereas the nitrogen in a gaseous state rises to the top. Such a rectifying column is able continuously to produce only either very pure oxygen or very pure nitrogen, but both not gases at the same time continuously in a very pure state worthy of compression, this being so whether the heating is limited, as already explained, to the lowest part (still, vaporizer,) of the entire column, or whether it is distributed over any desired larger part of its height. The smaller the quantity of either constituent withdrawn from the column, the greater will be its purity. For instance, when the amount of oxygen withdrawn is restricted, the oxygen vapor generated within the column therefore remains for the rectification of the liquid trickling down through the lower portion of the column. On the other hand, when the amount of gaseous nitrogen withdrawn from the top outlet is restricted, but not the oxygen output, there will be correspondingly less rising oxygen vapor to be rectified by the liquid nitrogen.

Assuming that pure oxygen is being obtained from the column, but the nitrogen issuing from the top outlet 4 is impure, one could endeavor to obtain nitrogen of greater purity by increasing the quantity of liquid nitrogen supplied through the inlet 2. The initial action of this operation is, indeed, that which is desired. Soon afterward, however, another action occurs which is very undesirable. In producing pure oxygen, the liquid mixture of oxygen and nitrogen must be rectified on its way to the lower end of the column by the rising gaseous oxygen into pure liquid oxygen. Assuming that, in its initial state, the quantity of oxygen lead out of the lower vaporizer into the column suffices for this, the increased quantity of liquid nitrogen entering the top of the column requires an increased quantity of oxygen vapor. Therefore, the supply of the latter must be increased. Then, however, the quantity of waste gas passing upward in the column is also increased, so that the increase in the supply of liquid nitrogen per unit quantity of waste gas is negatived and the nitrogen, which had actually become pure, again becomes impure as at the very first. The desired action is thus only temporary.

This *circulus vitiosus* actually renders it impossible to obtain both oxygen and nitrogen in the purest state at the same time by the known processes with the use of just so much of the apparatus as has been specifically described in connection with the accompanying drawings. According to my invention, this defect is obviated by diverting from the column at a point situated below the top outlet 4, through what may be termed the "fore outlet", 5, a suitable, regulated part of liquid nitrogen introduced into the top of the column, or by diverting a part of the gas rising from the column. The action of the fore outlet in either case increases the value of the ratio of the quantity of liquid introduced into the top of the rectifying column and the quantity of gas rising to the top of the column. The fore outlet 5 is located at a point approximately one-fifth to one-fifteenth of the entire operative height of the column proper from its top, so that the distance $h$ between the outlets 4 and 5 is approximately one-fifth to one-fifteenth of the distance $H$ between the outlets 3 and 4. For the sake of convenience, the distance $h$ in the drawing has been selected as being one-tenth of the distance $H$.

The use of the fore outlet will now be considered with reference to Fig. 1. Assuming, in the first place, (case I) that part of the rising gas in diverted through the fore outlet. In contradistinction to the state which existed in the old form of rectifying column, the rectifying capacity of a unit quantity of the liquid nitrogen is now concentrated on a smaller quantity of waste gas rising to the top of the column, so that it can be rectified to the utmost purity. The same holds true in the case (case II) when condensing it or similarly to the customary dephlegmation, *i. e.*, by precipitation in the upper end of the column in which the liquid oxygen obtained, or any other suitable liquid is evaporated under suitable pressure. In neither case is a large quantity of liquid nitrogen led to the lower end of the column, and therefore, in contradistinction to former processes, it is not necessary to conduct a large quantity of oxygen vapor upward in order to maintain the production of very pure oxygen, so that the upper supply of liquid nitrogen, which is increased relatively in both cases I and II and also absolutely in case II, is not negatived. In case I there is removed from the fore outlet a certain quantity of gas, a mixture of oxygen and nitrogen rising through the column and in case II, is rectified by the originally quite pure liquid nitrogen removed at the fore outlet. The quantity of oxygen therefore remains the same as at the very first and, for all these reasons, the quantity and purity of the useful oxygen collected at the bottom of the column also remains the same. It is true that in case II, a larger quantity of pure liquid nitrogen is supplied, but this additional quantity is continuously recovered during the reëvaporation of the liquid nitrogen which is led off to the same extent through the fore outlet, in accordance with the supplementary process, which will be described fully hereinafter.

As has already been stated, in carrying the invention into practice, it is immaterial whether the atmospheric air or the like is introduced at the middle inlet 1 of the column in a gaseous or in a liquid state. Furthermore, it is immaterial to the invention whether the liquid nitrogen to be introduced at the top inlet of the column is made by taking a part of the quite pure nitrogen gas from the top outlet and returning it under suitable pressure through the heating tube and condensing it, or similarly to the customary dephlegmation of other rectifying processes (for instance in rectifying spirits), by precipitating some of the gaseous nitrogen produced in the column on cooling tubes (not shown) in the upper end of the column, in which the liquid oxygen obtained, or any other suitable liquid, is evaporated under suitable pressure. Likewise, it is immaterial whether the column is heated only at the bottom (still evaporator), or whether the heating is distributed over a suitably large part of its height and possibly over its entire height.

In accordance with the invention, a nitrogen-oxygen column can be adjusted readily for obtaining both constituents in a pure state simultaneously by first adjusting the column so that the lower product, e. g. oxygen, is obtained pure at the outlet 3 and then by regulating the fore outlet 5 so as to continuously draw off from it either so much rising gas (case I) or so much liquid nitrogen (case II) that only very pure nitrogen, or nitrogen of the desired high degree of purity, flows away as the upper, gaseous product from the top outlet 4.

Even if the facts gained from experience and the above mentioned reasons demonstrate the possibility of simultaneous production of purest oxygen and purest nitrogen in a column of the kind in question, it is certain that continuous and certain uniformity in the following conditions would be necessary:

(a) in the supply and delivery of the gases and liquids into and out of the column;

(b) in the speed and pressure of the compressors and other lifting devices which are necessarily related to the column;

(c) in the supply of heat (by compressed gas) to cause the fractional evaporation;

(d) in the losses of cold and in the requisite cooling in consequence;

(e) in maintaining all parts of the column and piping perfectly tight; and (f) in having the column exceedingly large.

It would be quite impossible to fulfil all of these numerous conditions. By means of the present invention, however, their influence can be materially diminished. Namely, if sufficient gas or liquid is drawn off at the fore outlet, imperfections and defects of the kind mentioned might be present and occur to an exceedingly large extent without the satisfactory operation of the apparatus being interfered with and without having to regulate the apparatus laboriously. In these respects, the fore outlet therefore exercises a moderating and equalizing action and acts as a safety device.

Since, according to the present invention, a single column supplies purest oxygen and purest nitrogen at the same time, the output, as compared with oxygen and nitrogen columns heretofore known being equivalent, or indeed, more favorable, it replaces two of the former columns, or, indeed, complete plants; that is, one for obtaining purest oxygen and one for purest nitrogen.

Should it be desired to convert the present apparatus into an ordinary oxygen or nitrogen column, it is merely necessary to stop the flow from the fore outlet.

By the term "waste gas" applied to the gas escaping from the upper end of the column, it is not to be understood that this gas is worthless. On the contrary, as is well known, it may be the actual and important useful product in an impure condition.

It is to be understood that the invention relates to the fractional distillation not only of mixtures of nitrogen and oxygen, such as atmospheric air, but also to the decomposition of any other mixtures of two or more gases, one of which is more volatile than the other constituent or constituents, and another of which is more readily condensed.

In Fig. 2, a supplementary rectifying column is shown connected with a well-known type of main column modified in accordance with the present invention. The main column is indicated by the numeral 8 and has its fore outlet 5 connected by means of a pipe 9 with the inlet 1' of the supplementary column 10. The supplementary column has a top inlet 2' for liquid nitrogen, a top outlet 4' for the gaseous nitrogen product, and a bottom outlet 3' for the oxygen product, similar to the main column.

Since the mixture which is drawn off from the fore outlet of the main column contains very little oxygen, it is preferable not to separate this constituent in its pure state from it by means of rectification in the supplementary column. On the contrary, the nitrogen can be recovered quite pure very economically by the following simple supplementary process, in which a product rich in oxygen is obtained in addition. This last mentioned product is excellently adapted to be used, for example, for obtaining a very high temperature of combustion in a furnace or the like.

The gaseous or liquid mixture removed at the fore outlet 5 of the main column is led through the pipe 9 into the supplementary column at the inlet 1'. By supplying liquid nitrogen at the top of the column through the inlet 2' and by heating the column by means of the condenser-vaporizer 6', 7', the downwardly trickling liquid mixture is concentrated by evaporation and simultaneously rectified to some extent. The rectification enables the liquid mixture to be greatly enriched with oxygen, whereas the evaporation enables the rising gas to be enriched with nitrogen. Such a relatively large quantity of liquid nitrogen is allowed to flow into the present supplementary column that very pure nitrogen results as the upper gaseous product of decomposition, while at the bottom outlet not pure oxygen, but, thanks to the coöperation of fractional evaporation, as mentioned above, a product very rich in oxygen and excellently adapted to be used for useful purposes is obtained. The heat required for the evaporation is preferably obtained by means of nitrogen, the entire quantity of liquid nitrogen being then supplied to the supplementary column, if the same be fed with only gaseous mixture corresponding to case I at the medial inlet from the fore outlet of the main column. If this be done with liquid mixture (case II), say of the quantity M, just as large a quantity M of the heating nitrogen liquefied in the supplementary column must be led to the main column and only the remainder to the supplementary column. If the main column be heated with nitrogen which is supplied from the outside in a pure elementary state, the heating nitrogen of the supplementary column can, of course, be led with it in a common pipe through the exchange of heat device. If the main column be heated with atmospheric air, which is thereby condensed into fractions with which the main column is charged, according to processes well known in the art, the supplementary column can be heated with nitrogen, which is introduced during the fractional condensation of the heating air as a nonliquefied residue and in this instance flows in the form of atmospheric air or the like through the exchange of heat device. The pure nitrogen resulting from the supplementary column can, of course, be mixed with that flowing from the main column and be led through a common pipe through the exchange of heat device to its high temperature end and to the exterior.

Claims:

1. The combination of a rectifying column having an inlet for a gaseous or liquid mixture at the middle thereof, an inlet at the top thereof for the more volatile constituent of the mixture, an outlet at the bottom of the column for the lower product of decomposition, a top outlet for the upper product of decomposition, and an additional or fore-outlet in the upper part of the column below the top outlet for diverting a part of the contents of the column for increasing the value of the ratio between the liquid introduced into the top of the column and the gas rising to the top, and means for heating the column.

2. The combination of a main rectifying column having at the middle thereof an inlet for a mixture of a more volatile and more readily condensable constituent, an inlet at the top thereof for a supply of the more volatile constituent of the mixture, an outlet at the bottom thereof for the more readily condensable product of decomposition, a top outlet for the more volatile product of decomposition, and an additional fore-outlet in the upper part thereof below the top outlet for diverting a product which is a mixture of the two constituents to increase the value of the ratio of the quantity of the more volatile constituent at the top inlet and the quantity of gas rising to the top of the column, means for heating the column, and a supplemental column having a middle inlet connected with the fore-outlet of the main column, an inlet at the top of the supplemental column for a supply of the more volatile constituent of the mixture, and an outlet at the bottom thereof for the more readily condensable product of decomposition, a top outlet for the more volatile product of decomposition and means for heating the supplemental column.

3. A rectifying process for decomposing in a continuously operating rectifying column a mixture composed of a more volatile constituent and a constituent which can be more readily condensed, consisting in continuously supplying the mixture to the column at the middle thereof, in continuously introducing the more volatile constituent in a very pure liquid state into the top of the column, in fractionally evaporating the downwardly trickling liquid by means of heat applied externally and thereby enriching the constituent which can be more readily condensed, in continuously drawing off the pure more volatile constituent from an outlet at the top of the column, in continuously drawing off through an additional outlet provided below the top outlet a portion of the two constituents mixed together to increase the value of the ratio of the quantity of liquid introduced into the top of the column and the quantity of gas rising to the top of the same, and rectifying the mixture passing off through the said additional outlet in a supplementary rectifying column to produce one of the constituents in a pure state and a product rich in the other constituent.

4. The method of operating a rectifying column of the class described having a fore-outlet situated below the top gas outlet, to obtain simultaneously both constituents of the gaseous mixture to be decomposed and to increase the value of the ratio of the quantity of the liquid introduced into the top of the column in proportion to the quantity of gas rising to the said top of the column, which consists in first adjusting the column to purify the lower product of decomposition, then regulating the fore-outlet to draw off from the latter continuously so much of the constituent that the upper product of decomposition obtained at the top gas outlet acquires the desired degree of purity.

5. A rectifying process for decomposition in a continuously operating rectifying column, a gaseous mixture composed of a more volatile constituent and a constituent which can be more readily condensed, consisting in continuously supplying the gaseous mixture to the column at the middle thereof, in continuously introducing the more volatile constituent in a very pure liquid state into the top of the column, in fractionally evaporating the downwardly trickling liquid by means of heat applied externally and thereby enriching the constituent which can be more readily condensed, in continuously drawing off the latter pure constituent in a liquid or gaseous state from the bottom of the column, in continuously drawing off the pure more volatile constituent from an outlet at the top of the column, in continuously drawing off through an additional outlet provided below the top outlet, a quantity of the two constituents mixed together so that the value of the ratio of the quantity of liquid introduced into the top of the column to the quantity of gas rising to the top outlet.

In testimony whereof I have signed my name to this specification in the presence of two subscribing witnesses.

WALTER LACHMANN.

Witnesses:
 HENRY HASPER,
 ARTHUR SCHROEDER.